United States Patent [19]

Fuchs et al.

[11] 4,405,734
[45] Sep. 20, 1983

[54] PROCESS FOR MASS COLORING THERMOPLASTIC PLASTICS

[75] Inventors: Otto Fuchs, Grabenstätt; Adolf Kroh, Selters; Wolfgang Teige, Kelkheim, all of Fed. Rep. of Germany

[73] Assignee: Hoechst Aktiengesellschaft, Frankfurt am Main, Fed. Rep. of Germany

[21] Appl. No.: 414,812

[22] Filed: Sep. 3, 1982

[30] Foreign Application Priority Data

Sep. 5, 1981 [DE] Fed. Rep. of Germany ....... 3135328

[51] Int. Cl.$^3$ ...................... C08L 77/00; C08L 67/02
[52] U.S. Cl. .................................... 524/90; 524/605; 524/606
[58] Field of Search .......................................... 524/90

[56] References Cited

U.S. PATENT DOCUMENTS 2,988,402  8/1961  Geiger et al. ........................ 524/90
3,043,843  7/1962  Koch ..................................... 524/90

*Primary Examiner*—Lewis T. Jacobs
*Attorney, Agent, or Firm*—Curtis, Morris & Safford

[57] ABSTRACT

The invention relates to a process for coloring water-insoluble thermoplastic plastics with dyestuffs of the formula

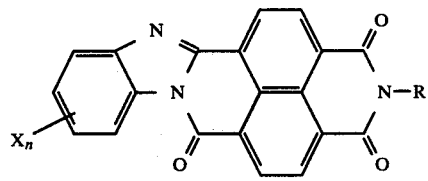

The dyestuffs are added to the melt of the thermoplastic plastic or to its precursors.

4 Claims, No Drawings

PROCESS FOR MASS COLORING THERMOPLASTIC PLASTICS

The use of naphthoylenebenzimidazoleperidicarboximides as vat dyestuffs has been known for a long time. U.S. Pat. No. 2,965,644 describes that it is possible to use such dyestuffs to dye fibers or films of polyesters, polyacrylonitrile or cellulose acetate from an aqueous solution or suspension. It has now been found that it is possible to use such dyestuffs for mass coloring, for example spin dyeing, also water-insoluble thermoplastic plastics.

The invention thus relates to a process for coloring water-insoluble thermoplastic plastics with compounds of the formula

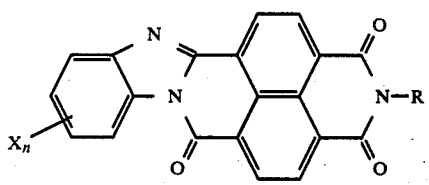

in which R denotes alkyl having 3 to 18 carbon atoms, hydroxyalkyl, alkoxyalkyl, hydroxyalkoxyalkyl, alkoxyalkoxyalkyl, carbalkoxyalkyl, carboxyalkyl or phenylalkyl having in each case 1 to 14 carbon atoms in the alkyl and alkoxy part respectively, X denotes halogen, alkyl, alkoxy, acylamino, acyl, carboxyl, carbalkoxy, carbamoyl, mono- or dialkylcarbamoyl, sulfamoyl, mono- or dialkylsulfamoyl having in each case up to 8 carbon atoms in the radicals, nitro or cyano, and n is 0 to 3, with the X substituents being identical or different, which comprises adding these compounds to the melt of the thermoplastic plastic or to its precursors.

Below, preferable embodiments of the invention are illustrated in more detail:

Among compounds of the abovementioned formula, termed "dyestuffs" for short below, those are preferable whose radical R is an unsubstituted alkyl group having 4 to 12, in particular 4 to 8, carbon atoms. Among substituted alkyl radicals R those are preferable whose alkyl or alkoxy parts have 1 to 8 carbon atoms, in particular those compounds in which R is an unbranched alkylene group having up to 5 carbon atoms to which a hydroxyl, carboxyl or an alkoxy group having up to 18, in particular up to 13, carbon atoms is bonded and which, in turn, can be substituted by hydroxyl or lower alkoxy groups.

If the dyestuffs carry X substituents those are preferable which carry one or two identical or different substituents from the series consisting of chlorine, bromine, lower alkyl, lower alkoxy, lower alkanoylamino, lower alkanoyl, carboxyl, lower carbalkoxy, carbamoyl, lower mono- or dialkylcarbamoyl, sulfamoyl or lower mono- or dialkylsulfamoyl, as well as nitro or cyano. Particularly preferable X radicals are chlorine, bromine, methyl, methoxy, ethoxy, acetyl, carboxyl, carbomethoxy, carbethoxy, cyano, nitro, carbamoyl, sulfamoyl and sulfamoyl and carbamoyl mono- or disubstituted by lower alkyl groups.

The dyestuffs can be prepared by the methods of U.S. Pat. Nos. 2,835,674 and 3,931,186.

Examples of water-insoluble thermoplastics, which can be colored according to the invention, are polymers of styrene, of acrylic and methacrylic acid as well as of their lower alkyl esters, of acrylonitrile, of olefins such as ethylene and propylene as well as of vinyl chloride and the corresponding mixed polymers, such as, for example, acrylonitrile/butadiene/styrene mixed polymers. Possible polycondensates are polyamides and, in particular, linear polyesters. Polyaddition products which may be mentioned are polyamides of the polycaprolactam type and polyesters of the polycaprolactone type.

Particularly preferable water-insoluble thermoplastic plastics colored according to the invention are linear polyesters obtained by polycondensation of glycols, such as ethylene glycol, 1,4-dihydroxybutane or 1,4-dimethylolcyclohexane, and terephthalic acid or its esters.

The plastics can be mass colored in a way which is in itself known, for example by applying the dyestuffs to the plastic and melting the mixture with one another or by introducing the dyestuffs into the melt of the finished plastic or of a precursor or adding to a low molecular weight precursor of the plastic before or during the synthesis of the thermoplastic.

In the preparation of pale shades, it is possible to admix the dyestuff to the plastic present in the form of granules or in the form of chips ("crumb-coating method") and then to heat and melt this mixture, with the result that the dyestuff dissolves in the plastic. The preparation of deep shades is difficult in this process because the plastic granules or chips, owing to their small surface area, accept only relatively small amounts of dyestuff since otherwise segregation and dusting occurs on handling the crumb-coated granules.

Not only pale but also very deep colorings can be obtained when the dyestuff is added in the form of a gritty or granular concentrate (formulation) to the plastic to be colored, for example to the granules or the melt. These colorant concentrates (master batches) consist of a suitable carrier material and varying, in some cases predominant, amounts of dyestuff. Examples of suitable carrier materials are low molecular weight polyethylene or polypropylene, pulverulent polyamide or also polyalkylene glycols, depending on which plastic is to be colored. Since, for example, polyethylenes or polyethylene waxes are only insufficiently compatible with polyesters, aliphatic polyesters having a melting point within a range from about 60° to 120° C., for example polyesters of the poly-ε-caprolactone type having a molecular weight of about 1000 to 50,000 or linear aliphatic esters derived from linear aliphatic dicarboxylic acids having 6 to 12 carbon atoms and aliphatic and/or cycloaliphatic glycols, such as, for example, poly-(ethylene glycol adipate), poly-(ethylene glycol sebacate), poly-(ethylene glycol decanedicarboxylate) and polycyclohexane-1,4-diol adipate) having molecular weights of about 2000 to 15,000, are accordingly used as carrier polymers for the dyestuffs in the mass coloring of thermoplastic polyesters.

Such dyestuff concentrates can be prepared in a way which is in itself known, for example by means of a kneader in which the dyestuff is mixed with the carrier at a suitable temperature at which the melted carrier has a sufficiently high viscosity or, as the case may be, the dyestuff is dissolved in the carrier material. These master batches do not dust and make it possible to color the plastic even in very high depths of shade.

If it is intended to color the thermoplastic plastic already in its preparation, the dyestuff is added directly, or in the form of a master batch, to the polymerization, polyaddition or polycondensation mass before or during the preparation of the polymer. In the case of preparation of a polyester, the dyestuff is preferably dispersed in the starting glycol.

The plastics mass-colored by one of the above-mentioned processes can be further shaped and processed by customary methods, for example in injection molding, in spinning processes or in the manufacture of films.

The amount of dyestuff employed depends on the depth of shade desired and is in general between about 0.05 to 3% by weight, relative to the weight of the thermoplastic material colored. The dyestuffs used according to the invention are distinguished not only by the high solubility necessary for this purpose but also by the thermostability required and absolutely essential in such processes.

Since the dyestuffs to be used according to the invention dissolve in the thermoplastic plastics and thus become molecularly dispersed, there are no problems in respect of strength and stretchability in the manufacture of filaments and films. Unlike the coloring with pigments, the process according to the invention does not need fine-dispersing of the pigment and there is no abrasion and no blockages of dies and filters.

A particularly preferable process according to the invention is the spin dyeing of thermoplastic plastics, in particular of polyesters. When spinning on an extrusion spinning plant, the dyestuff can be metered directly into the melt of the plastic, advantageously via a side screw, preferably in the form of a melted concentrate. Homogeneous mixing takes place in this case and the dyestuff becomes dissolved in the polymer. It is possible to proceed in the same way when spinning on a coiled grid spinning plant. Melted master batches can advantageously be added straight to the polymer melt directly before the spinning jet (injection method). This procedure enables contamination of the spinning plant by the dyestuff to be avoided, so that colorings differing in hue or in depth of shade can be carried out without a major effort.

The process according to the invention produces deep, brilliant greenish yellow to red-brown colorings affect the viscosity of the spinning melts even in the case of deep colorings, so that the filaments and films are not impaired in strength and extensibility.

The examples which follow illustrate the invention in more detail. Parts and percentages are by weight unless otherwise indicated.

EXAMPLE 1

1 part of the dyestuff of the formula

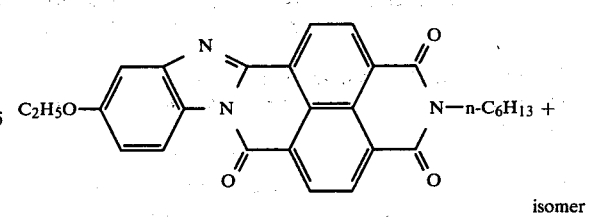

isomer was mixed with 99 parts of poly-1,4-dimethylolcyclohexane terephthalate granules and the mixture was melted at a temperature of 270° to 290° C., and a homogeneous solution of the dyestuff mentioned in the melt formed. This colored melt was spun in the melt spinning process into polyester filaments having a brilliant, red-brown hue and distinguished by a very good fastness to heat setting and light.

EXAMPLES 2–5

The procedure of Example 1 was followed, but one of the dyestuffs of the following general formula

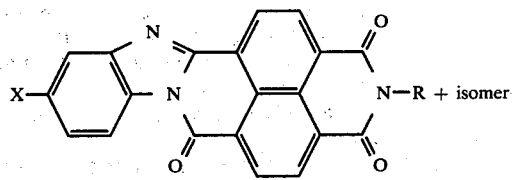

was used. Likewise very brilliant colorings having very good fastness properties were obtained.

| Example | X | R | Hue |
|---|---|---|---|
| 2 | —CH$_3$ | CH$_2$—CH$_2$—CH$_2$—O—CH$_2$—CH$_2$—CH$_2$—CH$_3$ | orange |
| 3 | —COOH | —CH$_2$—CH(CH$_3$)$_2$ | greenish yellow |
| 4 | | —CH$_2$—CH(CH$_3$)$_2$ | yellow |
| 5 | —CONH—CH$_2$—CH$_2$—CH$_2$—CH$_3$ | —CH$_2$—CH$_2$—CH$_2$—O—(CH$_2$)$_7$—CH$_3$ | greenish |
|   | —NO$_2$ | CH$_2$—CH$_2$—CH$_2$—CH$_2$—CH$_2$—CH$_2$—CH$_2$—CH$_3$ | yellow | which have excellent light, weathering, rubbing and heat setting fastness. This is surprising in view of the ready polymer solubility of the dyestuffs. It is particularly advantageous that the dyestuffs do not adversely

EXAMPLE 6

10 parts of the compound of the formula

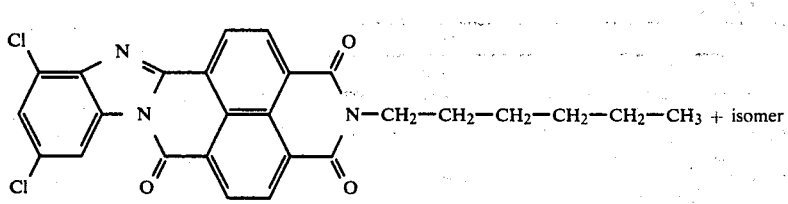

were stirred for 30 minutes with 90 parts of ethylene glycol by means of a high speed stirrer to give a paste. 5 parts of this paste were mixed with 95 parts of bis-($\beta$-hydroxyethyl) terephthalate and heated for 6 hours at a temperature between 270° and 280° C. under a high vacuum, during which period the condensation to give the polyester took place. The colored melt thus obtained was cooled down and granulated in a customary manner.

It is possible to process the colored polyester mass by customary processes into shaped structures of the most diverse types, such as, for example, in injection molding or in the melt spinning process. In particular in the processing into filaments, brilliant, yellow colorings were obtained which had a very good fastness to heat setting and light.

EXAMPLE 7

2.5 parts of a preparation of 40 parts of the compound

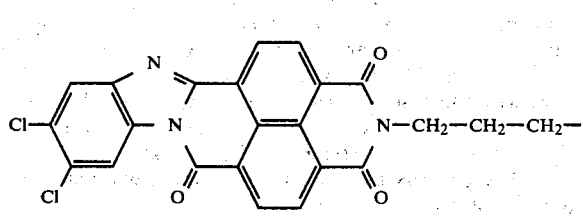

and 60 parts of a carrier material as a covering polymer were mixed with 97.5 parts of polyethylene glycol terephthalate and spun by a melt spinning process customary for polyester materials into a filament yarn. The filament material thus obtained was distinguished by a brilliant, yellow shade having excellent fastness properties.

The formulation used above was prepared as follows: the colorant and the carrier material were mixed with one another, then melted together, extruded, discharged via a twin screw extruder and then granulated.

As the carrier material there was used an isophthalic acid-terephthalic acid-copolyester with ethylene glycol.

Useful carrier materials are isophthalic acid-terephthalic acid-copolyesters with neopentyl glycol and other polyesters and polyamides such as, for example, poly-$\epsilon$-caprolactone, poly-(ethylene glycol adipate), poly-(ethylene glycol sebacate), poly-(ethylene glycol decanedicarboxylate), poly-(cyclohexanediol adipate).

EXAMPLES 8–54

The procedures described in Examples 1, 6 or 7 were followed, but, instead of the dyestuffs described there, one of the compounds indicated in the table below and of the following general formula

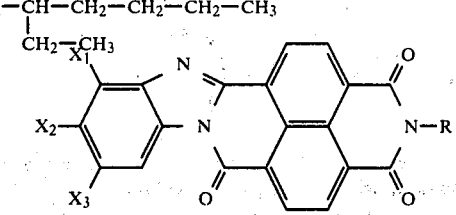

in case of the possibility of isomer formation in the condensation in mixture with the corresponding isomer was used. Colored polyester masses and colored filaments were obtained in the shades indicated in the table with similarly good application properties and fastness properties.

| Example No. | $X_1$ | $X_2$ | $X_3$ | R | Hue |
|---|---|---|---|---|---|
| 8 | H | Cl | Cl | $(CH_2)_3$—O—n-$C_{13}H_{27}$ | yellow |
| 9 | H | Cl | H | $(CH_2)_3$—O—n-$C_4H_9$ | yellow |
| 10 | H | $NO_2$ | H | $(CH_2)_3$—O—n-$C_4H_9$ | greenish yellow |
| 11 | H | $OCH_3$ | H | n-$C_6H_{13}$ | reddish brown |
| 12 | H | Cl | H | n-$C_6H_{13}$ | yellow |
| 13 | H | COOH | H | n-$C_6H_{13}$ | yellow |
| 14 | H | COOH | H | $(CH_2)_3$—O$(CH_2)_2$—O—n-$C_4H_9$ | yellow |
| 15 | H | $CH_3$ | H | $CH_2$—$CH(CH_3)_2$ | orange |
| 16 | H | $CH_3$ | H | n-$C_6H_{13}$ | orange |
| 17 | H | $CH_3$ | H | $(CH_2)_3$—O—$(CH_2)_2$—O—n-$C_4H_9$ | orange |
| 18 | H | H | H | $(CH_2)_3$—O—$(CH_2)_2$—O—n-$C_4H_9$ | yellow |
| 19 | H | H | H | $(CH_2)_3$—O—n-$C_4H_9$ | yellow |
| 20 | H | $COOCH_3$ | H | $(CH_2)_3$—O—$(CH_2)_4$—OH | greenish yellow |
| 21 | H | Cl | H | $(CH_2)_3$—O—n-$C_8H_{17}$ | yellow |
| 22 | H | H | H | $(CH_2)_3$—O—$(CH_2)_4$—OH | yellow |
| 23 | H | Cl | H | $(CH_2)_3$—O—$CH_2$—$CH(C_2H_5)$—n-$C_4H_9$ | yellow |
| 24 | H | $CH_3$ | H | $(CH_2)_3$—O—n-$C_8H_{17}$ | orange |
| 25 | H | $CH_3$ | $CH_3$ | $(CH_2)_3$—O—n-$C_4H_9$ | orange |

-continued

| Example No. | X₁ | X₂ | X₃ | R | Hue |
|---|---|---|---|---|---|
| 26 | CH₃ | CH₃ | H | (CH₂)₃—O—n-C₄H₉ | orange |
| 27 | H | CH₃ | Cl | (CH₂)₃—O—n-C₄H₉ | reddish yellow |
| 28 | H | CH₃ | H | (CH₂)₃—O—n-C₁₃H₂₇ | orange |
| 29 | H | CN | H | n-C₈H₁₇ | greenish yellow |
| 30 | H | CN | H | (CH₂)₃—O—n-C₈H₁₇ | greenish yellow |
| 31 | H | CN | H | n-C₁₂H₂₅ | greenish yellow |
| 32 | H | CONH₂ | H | (CH₂)₃—O—n-C₁₃H₂₇ | yellow |
| 33 | H | CON(CH₃)₂ | H | (CH₂)₃—O—(CH₂)₂—O—n-C₄H₉ | yellow |
| 34 | H | Br | H | n-C₈H₁₇ | yellow |
| 35 | H | COOC₂H₅ | H | n-C₆H₁₃ | yellow |
| 36 | H | SO₂NH₂ | H | (CH₂)₃—O—n-C₄H₉ | orange |
| 37 | H | CO—CH₃ | H | (CH₂)₃—O—n-C₈H₁₇ | yellow |
| 38 | H | SO₂NH—CH₃ | H | (CH₂)₃—O—n-C₄H₉ | orange |
| 39 | H | OC₂H₅ | H | (CH₂)₃—O—CH₂—CH₂—OH | reddish brown |
| 40 | H | OC₂H₅ | H | (CH₂)₄—OH | reddish brown |
| 41 | H | OC₂H₅ | H | (CH₂)₅—COOH | reddish brown |
| 42 | H | OC₂H₅ | H | (CH₂)₃—O—CH₂—CH(C₂H₅)—n-C₄H₉ | reddish brown |
| 43 | H | OCH₃ | H | CH₂—CH(CH₃)₂ | reddish brown |
| 44 | H | OCH₃ | H | (CH₂)₃—O—(CH₂)₂—O—C₂H₅ | reddish brown |
| 45 | H | OC₂H₅ | H | (CH₂)₃—O—CH₃ | reddish brown |
| 46 | Cl | H | Cl | n-C₇H₁₅ | yellow |
| 47 | Cl | H | Cl | (CH₂)₃—O—CH₂—CH(C₂H₅)—n-C₄H₉ | yellow |
| 48 | Cl | H | Cl | CH₂—CH(CH₃)₂ | yellow |
| 49 | H | Cl | Cl | (CH₂)₃—O—CH₃ | yellow |
| 50 | H | CH₃ | Cl | n-C₁₂H₁₅ | yellow |
| 51 | H | CH₃ | CH₃ | (CH₂)₄—OH | orange |
| 52 | H | CH₃ | CH₃ | n-C₄H₉ | orange |
| 53 | CH₃ | CH₃ | H | (CH₂)₃—O—(CH₂)₂—O—n-C₄H₉ | orange |
| 54 | H | H | H | (CH₂)₃—O—n-C₁₃H₂₇ | yellow |

We claim:
1. A process for coloring water-insoluble thermoplastic plastics with dyestuffs of the formula

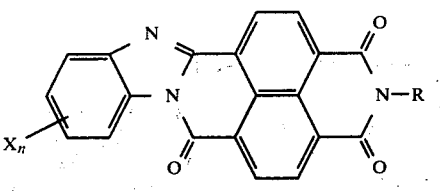

in which R denotes alkyl having 3 to 18 carbon atoms, hydroxyalkyl, alkoxyalkyl, hydroxyalkoxyalkyl, alkoxyalkoxyalkyl, carbalkoxyalkyl, carboxyalkyl or phenylalkyl having in each case 1 to 14 carbon atoms in the alkyl and alkoxy part respectively, X denotes halogen, alkyl, alkoxy, acylamino, acyl, carboxyl, carbalkoxy, carbamoyl, mono- or dialkylcarbamoyl, sulfamoyl, mono- or dialkylsulfamoyl having in each case up to 8 carbon atoms in the radicals, nitro or cyano, and n is 0 to 3, with the X substituents being identical or different, which comprises adding these dyestuffs to the melt of the thermoplastic plastic or to its precursors.

2. The process as claimed in claim 1, wherein the plastic is a linear polyester.

3. The process as claimed in claim 1 or 2, wherein the dyestuff is added to a spinning composition.

4. A colored water-insoluble thermoplastic plastic, obtained by one of the processes as claimed in claim 1 or 2.